United States Patent Office 3,576,737
Patented Apr. 27, 1971

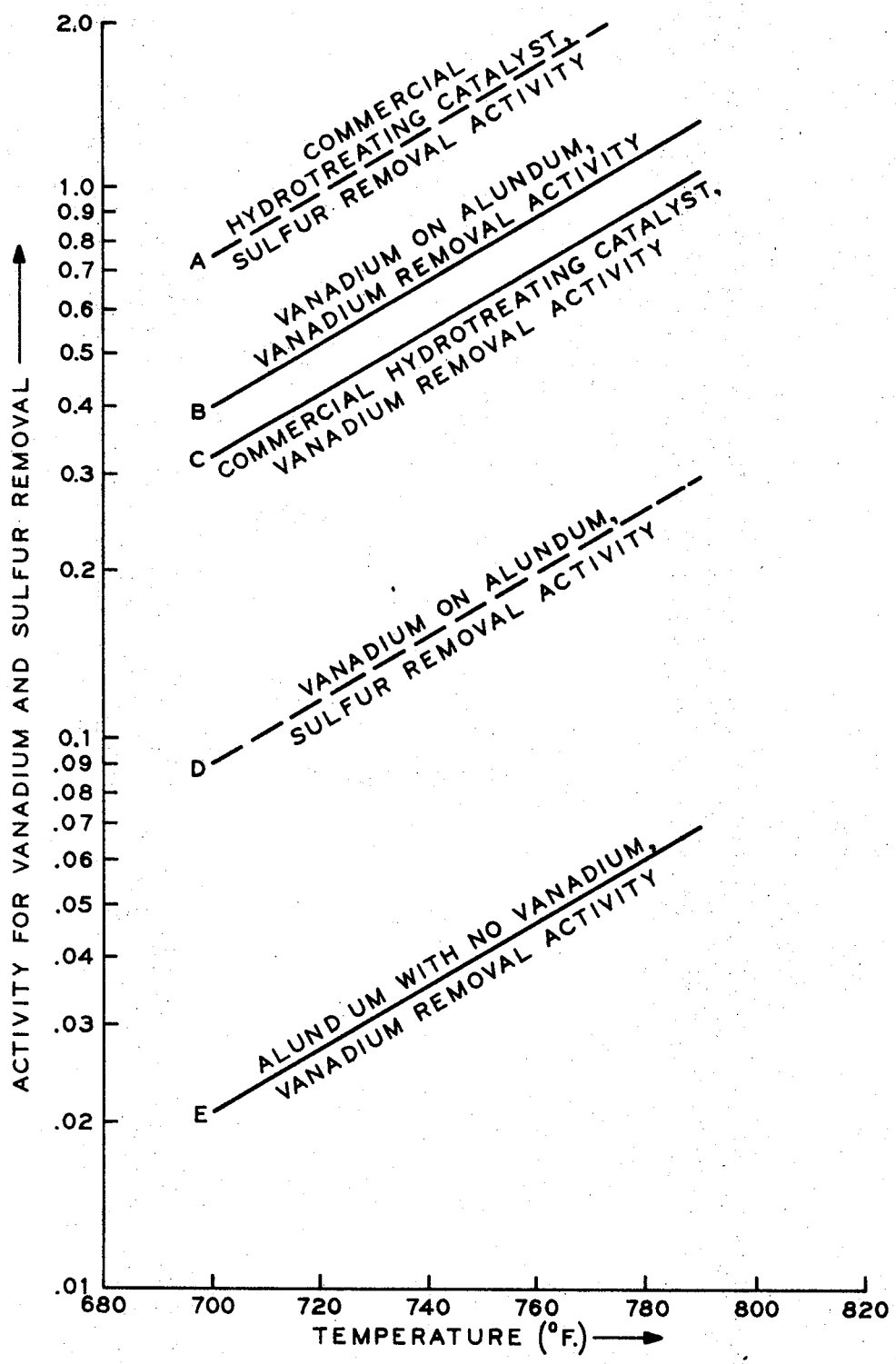

3,576,737
VANADIUM REMOVAL FROM HYDROCARBONS
David S. Mitchell, Fairfax, Calif., assignor to Chevron Research Company, San Francisco, Calif.
Filed Mar. 25, 1969, Ser. No. 810,241
Int. Cl. C10g 23/00, 25/00, 29/04
U.S. Cl. 208—251                                3 Claims

ABSTRACT OF THE DISCLOSURE

A process for removing vanadium from a hydrocarbon feedstock containing vanadium as a soluble organometallic compound by contacting said hydrocarbon feedstock at an elevated temperature and pressure and in the presence of hydrogen with particles having a substantial number of macropores and containing vanadium which has been combined with the particles prior to processing of said hydrocarbon feedstock for vanadium removal.

BACKGROUND OF THE INVENTION

Field of the invention

The present invention relates to the treatment of hydrocarbons to remove metallic contaminants from the hydrocarbons. More particularly, the present invention relates to the treatment of petroleum hydrocarbons such as heavy oils and residuum feedstocks, which are unsuitable as feeds to catalytic cracking or hydrocracking units, to convert them to suitable feedstocks by removal of metallic contaminants such as vanadium.

Description of the prior art

Crude petroleum oil, toped crude, and other hydrocarbon fractions and/or distillates derived therefrom contain various metallic impurities. The most common metallic contaminants are vanadium and nickel, although other metals including iron, copper and zinc are often present. These metals may occur as suspended metal oxides or sulfides or water-soluble salts which may be removed, at least in part, by filtration, water-washing, electric desalting, or other fairly simple physical means. Mainly, however, the metals occur as thermally stable metalloorganic complexes such as metal porphyrins and derivatives thereof which are not susceptible to removal by simple physical means. Most of the metallo-organic complexes are associated with the asphaltenes and become concentrated in residual fractions; other metallo-organic complexes are volatile and are therefore carried over in distillate fractions. Reducing the concentration of the metallo-organic complexes is not easily achieved, at least to the extent that the crude oil or other heavy hydrocarbon charge stock may be made suitable for further processing or use. Even though the concentration of these metallo-organic complexes may be relatively small in distillate oils, for example, often less than about 10 p.p.m. as the elemental metal, subsequent processing techniques are often adversely affected thereby. For example, when a hydrocarbon charge stock containing metallo-organic compounds, such as metal porphyrins, in excess of about 3.0 p.p.m. calculated as the elemental metal, is subjected to hydrocracking or catalytic cracking for the purpose of producing lowerboiling components, the metals deposit upon the catalyst, the concentration thereof increasing with time. Since vanadium and the iron group metals favor dehydrogenation activity at ordinary cracking temperatures, the resulting contaminated hydrocracking or cracking catalyst produces increasingly excessive amounts of coke, hydrogen and light hydrocarbon gases at the expense of more valuable liquid product until eventually the catalyst must be subjected to elaborate regeneration techniques or be replaced with fresh catalyst. The presence of excessive quantities of metallo-organic complexes adversely affects other processes including catalytic reforming, isomerization, hydrodealkylation, etc. Vanadium itself is also objectionable in heavy fuel oils and residual solids used as fuels because vanadium pentoxide formed during combustion is a strong acid at high temperature and will corrode the refractory lining, tube supports and other internal hardware of a fired heater utilizing such fuel.

Various methods have been proposed for removing metals from hydrocarbons so that the hydrocarbon feedstock is better suited for catalytic cracking, hydrocracking, etc. Among the methods that have been proposed for removal of metallic contaminants, catalytic hydrogenation is probably the most frequently suggested. For example, in U.S. Pat. 3,227,645 a catalytic hydrogenation process is disclosed for the removal of metallic contaminants from a hydrocarbon feedstock prior to hydrocracking or catalytic cracking of the hydrocarbon feedstock. According to the process combination disclosed in U.S. Pat. 3,227,645, the preferred operating conditions for the catalytic hydrogenation metals removal step include contacting the high boiling oil containing metal contaminants at temperatures of 350–800° F. and pressures of 200 to 3,000 p.s.i.g. with hydrogen in the presence of a sulfur-resistant hydrogenation catalyst. According to U.S. Pat. 3,227,645, usually the hydrogenation catalyst will comprise one or more of the oxides, sulfides or other compounds of metals of Group VI and/or Group VIII of the Periodic Table alone or supported on a carrier. Typically the carrier is a refractory oxide support such as alumina, silica, or silica-alumina but charcoal and other inert materials may also be used.

U.S. Pat. 3,180,820 also discloses a catalytic hydrogenation process for removing metallic contaminants from hydrocarbons. The hydrogenation catalyst used according to the process disclosed in U.S. Pat. 3,180,820 is characterized broadly in the patent as comprising a metallic component having hydrogenation activity which may be employed in an unsupported state or in a supported form when it is composited with a refractory inorganic oxide material of synthetic or natural origin having a medium to high surface area and a well developed pore structure. Suitable metallic components having hydrogenation activity as disclosed by U.S. Pat. 3,180,820 include the metals of Groups V–B, VI–B and VIII of the Periodic Table; that is, the Periodic Table contained in the Handbook of Chemistry and Physics, 39th edition (1957–58). According to the broad disclosure of U.S. Pat. 3,180,820, suitable metallic components include vanadium, niobium, tantalum, molybdenum, tungsten, chromium, iron, cobalt, nickel, platinum, palladium, iridium, osminium, rhodium, ruthenium, and compounds thereof.

Another patent which discloses a catalytic hydrogenation process for the removal of metallic contaminants from hydrocarbons is U.S. Pat. 2,764,525. This patent is directed to a process for the removal of vanadium and/or sodium from petroleum and petroleum products with alumina and iron oxide. According to the process disclosed in U.S. Pat. 2,764,525, vanadium and/or sodium are removed from crude petroleum or petroleum products by contacting the crude petroleum or petroleum products with a contact material consisting essentially of iron oxide and alumina, in the presence of hydrogen and under conditions of temperature and pressure such that the vanadium and/or sodium deposit on the contact material. The contact material preferably contains 5–15% by weight of ferric oxide, the remainder consisting essentially of alumina. The use of iron on alumina as a hydrotreating catalyst, in this instance as a treating catalyst for the removal of metallic contaminants, is similar to a number of other catalytic hydrogenation processes using metals from the iron group—that is, Group VIII-B—on refractory supports such as alumina.

As interest in obtaining gasoline and other light products from heavy refractory oils such as atmospheric and vacuum residua has increased, it has become increasingly apparent that an economic process is needed to remove metallic contaminants from heavy hydrocarbons. It has also become apparent that many catalysts lose their activity for demetalation rapidly. Thus an inexpensive catalyst and method are needed for removal of large quantities of metals from hydrocarbons while maintaining good hydrodemetalation activity for a considerable period of time.

Vanadium is prominent among the metals which usually need to be removed from heavy hydrocarbon feedstocks in order to prepare the hydrocarbon feedstock for catalytic cracking, hydrocracking, or similar processes.

SUMMARY OF THE INVENTION

In accordance with the present invention a process is provided for removing vanadium from a hydrocarbon feedstock containing vanadium as a soluble organometallic compound, which process comprises contacting said hydrocarbon feedstock at an elevated temperature and pressure and in the presence of hydrogen with particles having a substantial number of macropores and containing vanadium which has been combined with the particles prior to processing of said hydrocarbon feedstock for vanadium removal.

It has been found that vanadium on a support having a substantial number of pores greater than 300 A. in diameter, preferably greater than 500 A. in diameter, is very effective in removing metals in a hydrodemetalation process. For purposes of this specification macropores are pores having a diameter greater than 500 A. Catalysts which have been used for hydrometalation typically contain essentially no macropores, but instead contain essentially only micropores—that is, pores whose diameter is considerably less than 500 A., as for example 50 to 150 A. These catalysts generally have initial high activity in a number of instances for sulfur and nitrogen removal. However, these catalysts become rapidly plugged with metals and their activity for metals removal drops off rapidly.

More particularly, I now have found that vanadium impregnated into a macroporous inorganic support such as Alundum is very effective for metals removal, particularly removal of vanadium and nickel present in the hydrocarbon feedstock as organometallic compound, when the average diameter of the pores in the Alundum is greater than 300 A., preferably greater than 450 or 500 A. To achieve this large average pore diameter, it is usually necessary to have a substantial number of macropores, that is, at least 5 to 30% of its pore volume in the form of macropores.

Usually the hydrocarbon feedstocks which are processed in accordance with present invention are heavy hydrocarbons, boiling, for example, in excess of 800° F. and containing at least 10 p.p.m. vanadium. However, in many instances it is desirable to remove vanadium from hydrocarbon feedstocks containing only about 3 p.p.m. by weight of vanadium calculated on a pure element basis. Preferably the hydrocarbon feedstock is contacted with the large pored particles at a temperature between about 600° and 900° F. and at a hydrogen partial pressure of between about 100 and 3000 p.s.i.g. Typically the hydrocarbon feedstock is flowed concurrently with the hydrogen gas over a bed of the inorganic particles contained in a reactor vessel at a liquid hourly space velocity (LHSV) between 0.1 and 10.0.

Various macroporous materials may be used as the support onto or into which the catalytic vanadium component is impregnated. It is critical that the support contain a substantial number of macropores so that the average pore diameter is at least 300 A. As a probable theory of operation of the present invention, it is believed that the organometallic compounds of vanadium present as contaminants in the hydrocarbon feedstock enter into the large pores wherein the organic bonds to the vanadium are broken due to the hydrometalation cracking reaction which is catalyzed by the vanadium previously impregnated into the macroporous refractory support. The severed off contaminant vanadium then deposits along the wall of the support and the remaining organic molecule or molecules escape from the large pore. The largeness of the pore size allows the organic molecule or molecules severed from the contaminant vanadium to escape so that the pore is not badly blocked by coke. For smaller pore size the severed organic molecule or molecules may be trapped by the deposited vanadium contaminant, so that resulting coke formation causes the port to be tightly blocked and thus rendered ineffective for further removal of contaminant vanadium. Also, in those instances where the coke formation is kept to a low amount, a small pore may be quickly choked off by the deposit of only a few of the severed contaminant vanadium atoms. A large pore is more apt to remain an open channel into the catalyst particles so that a relatively large number of severed vanadium atoms can be deposited along the wall of the pore, and perhaps more importantly, the large pore hole allows the large organometallic compounds of vanadium to diffuse more rapidly towards the center of the catalyst.

Because of organometallic compound diffuses into the large pore hole relatively rapidly, compared to a diffusion into a micropore hole, the depositing vanadium is less likely to accumulate rapidly at the mouth of the pore and therefore the large pore hole is less likely to rapidly be plugged than is the small pore hole.

Thus the support particle may be selected from a wide range of materials which are formed so as to contain a large number of macropores. Large pored charcoal, alumina, silica, and alumina-silica particles may be used. Large pored alundum particles consisting mostly of aluminum oxide but also containing a small amount of silica is a particularly preferred support onto which the catalytic vanadium component is impregnated.

Preferably the particles consist essentially of large pored alumina or alundum containing about 0.1 wt. percent of vanadium and more desirably about 0.5 wt. percent to 10 wt. percent vanadium which has been combined with the alumina or alundum particles prior to processing of the hydrocarbon feedstock for vanadium removal.

In addition to the finding that the vanadium on the large pored support is effective for removing vanadium present in a hydrocarbon feedstock as organo-vanadium compounds, there is also an autocatalytic effect resulting from the depositing vanadium. However, for most hydrocarbon feedstocks this autocatalytic effect is not sufficient by itself to afford satisfactory contaminant metal removal rates.

BRIEF DESCRIPTION OF THE DRAWING

The drawing is a graph illustrating by example results from the type catalyst of the present invention as compared to a conventional catalyst for hydrodemetalation.

DETAILED DESCRIPTION OF THE DRAWING

Referring in more detail to the drawing, the abscissa shows the temperature at which a number of experimental runs were made testing different catalysts for metals removal activity. The ordinate shows the relative activity of the catalyst for vanadium removal and for sulfur removal. The activity is calculated according to the formula, $(K) = (SV)^{0.8} \times$ natural logarithm (metals feed/metals product) or in the case of activity for sulfur removal, $K = (SV)^{0.8} \times$ natural logarithm (sulfur (feed/sulfur product). Where K is the activity constant and SV is the liquid hourly space velocity through the catalyst bed (volume of liquid oil at 60° F. per volume of catalyst per hour).

The graph illustrates that the catalyst comprised of vanadium on alundum has surprisingly good activity for vanadium removal, and in fact has better activity than the relatively expensive commercial hydrotreating catalysts. It can also be seen from the graph that the catalyst comprising vanadium on alundum is particularly selective for metals removal—that is, the catalyst has particularly high metals removal activity in contrast to its sulfur removal activity. In addition, the graph illustrates the unexpected superiority of the vanadium an alundum catalyst for vanadium removal as compared to the use of pure alundum for vanadium removal.

The feed used to obtain the data shown in the drawing was an Arabian light residuum having a boiling range of 525° F. to 1000° F.+and an API gravity of 17.4. The different catalysts were contained in a reactor, and the residuum was flowed through the reactor at a space velocity of about 1.2 volumes of oil per hour per volume of catalyst (LHSV). The hydrogen total pressure was maintained at about 1400 p.s.i.g.

The alundum particles which were used to obtain curve E had the following properties: Mesh size 8–14; bulk density, 0.602 g./ml.; particle density, 1.36 g./ml.; pore volume, 0.491 ml./g.; BET nitrogen surface area, 34 m.$^2$/g.; $Al_2O_3$, 83 wt. percent; $SiO_2$, 15.3 wt. percent; $Fe_2O_3$, 0.44 wt. percent; $TiO_2$, 0.5 wt. percent; CaO, 0.09 wt. percent; and the balance miscellaneous. The alundum is made by Norton Co. of Mass. and is designated LA 3032 alundum.

The vanadium on alundum which was used to obtain curves B and D had the following properties. Mesh size, 8–14; bulk density, 0.715 g./ml.; particle density 1.49 g./ml.; pore volume, 0.477 ml./g.; BET nitrogen surface area, 23 m.$^2$/g.; average pore diameter, 830 A.; $Al_2O_3$, 76 wt. percent; $SiO_2$, 14 wt. percent; vanadium, 7.9 wt. percent. The vanadium was combined with the alundum by impregnation, that is, by dunking alundum particles in an oxalic acid solution of vanadium pentoxide. The initial alundum, that is, prior to the vanadium impregnation, is the same as that used to obtain curve E.

The average pore diameter for the vanadium on alundum was determined by dividing the surface area (as determined by the well known BET nitrogen absorption-desorption techniques using an adsorptomat instrument) into the pore volume and multiplying the quotient by four. The pore volume is suitably determined by adding the micropore volume, obtained by BET nitrogen absorption-desorption techniques, to the macropore volume, obtained by using a mercury porsimeter.

The calculation of pore diameter by dividing surface area into pore volume and multiplying the quotient by four is based on the following. The catalyst particles is assumed to be a large collection of attached pores or cylindrical openings. This assumption is further simplified by treating the particle as one long cylinder for purposes of calculating the average pore diameter. The volume of the cylinders $$L \times \frac{\pi D^2}{4}$$

where L is the length, and D is the diameter. The inside surface area is $L \times \pi D$. Therefore the surface area divided into the volume is $D/4$. This calculation of an average pore diameter agrees reasonably well with more precise detailed calculations in most instances.

The commercial hydrotreating catalyst which was used to obtain curves A and C had the following properties: Mesh size, 8–14; bulk density, 0.739 g./ml.; particle density, 1.20 g./ml.; pore volume, 0.600 ml./g.; BET nitrogen surface area 218 m.$^2$/g. $Al_2O_3$, 54 wt. percent; $SiO_2$, 20 wt. percent; $MoO_3$, 18 wt. percent; NiO, 5 wt. percent.

As can be seen from the drawing, the use of the catalyst particles comprised of vanadium on alundum had a much greater activity for the removal of vanadium from the residum than did the pure alundum. At 750° F. the vanadium on alundum had an activity constant of about 0.76, whereas the pure alundum had an activity constant of only about 0.04. Thus with the vanadium on the alundum the activity was improved in this test run by a factor of approximately 19. In the test run at 750° F., 1.2 LHSV using the vanadium on alundum catalyst, approximately 49% weight of the vanadium (calculated as the pure metal) contained in the hydrocarbon feedstock was removed from the hydrocarbon feedstock.

The amount of vanadium removed is usually at least 20 wt. percent of the vanadium contained in the hydrocarbon feedstock to the catalyst bed, and in most instances between about 35 to 70 wt. percent of the vanadium contained in the feedstock is removed by the simple vanadium on Alundum catalyst in the hydrodemetalation process of the present invention. The commercial hydrotreating catalyst which was used to obtain curve C is a very good catalyst for hydrotreating, particularly for hydrodemetalation and hydrodesulfurization. However, it is seen that at 750° F. the activity of the commercial hydrotreating catalyst for vanadium removal was about 0.64, whereas the activity constant of the simple and economic vanadium on Alundum catalyst was about 0.76.

As mentioned earlier, the vanadium on Alundum catalyst is very selective for metals removal. This can be readily seen by comparing curves B and D, and also contrasting curves B and D to curves A and C, respectively. Thus at 750° F. the activity of the vanadium on Alundum catalyst for sulfur removal was only about 0.17, whereas its activity for vanadium removal was about 0.76. On the other hand, the activity of the commercial hydrotreating catalyst for sulfur removal was about 1.5 at 750° F. and its activity for vanadium removal was 0.64 at 750° F. Upon passing the Arabian light residuum through a bed of commercial hydrotreating catalyst at about 750° F. and a space velocity of 1.2, the percent conversion of organic sulfur compounds to $H_2S$ was about 67 wt. percent, whereas the percent sulfur removal for the vanadium on Alundum catalyst was only about 14 wt. percent.

Although various specific embodiments of the invention have been described and discussed, it is to be understood that they are meant to be illustrative only and not limiting. Certain features of the process may be changed without departing from the spirit or essence of the invention. It is apparent that the present invention has broad application to the removal of vanadium present in a hydrocarbon feedstock in the form of organometallic compounds by contacting the hydrocarbon feedstock with a catalyst comprised of vanadium and a porous support. Accordingly, the invention is not to be construed as limited to the specific embodiments illustrated but only as defined in the following claims.

I claim:
1. A process for removing vanadium from a hydrocarbon feedstock containing at least 10 p.p.m. vanadium as a solid organometallic compound, which process comprises contacting said feedstock at a temperature between 600 and 900° F. and a hydrogen partial pressure between 100 and 3,000 p.s.i.g. with catalyst particles containing about 0.5 to 10 weight percent vanadium which has been combined with the particles prior to processing of said hydrocarbon feedstock for vanadium removal and having pores with an average pore diameter greater than 300 angstroms.

2. A process in accordance with claim 1 wherein the average pore diameter of the particles is greater than 500 angstroms.

3. A process in accordance with claim 2 wherein said particles consist essentially of Alundum and about 0.5 to 10 weight percent vanadium.

(References on following page)

References Cited

UNITED STATES PATENTS

| | | | |
|---|---|---|---|
| 2,970,957 | 2/1961 | Northcott et al. | 208—251 |
| 2,764,525 | 9/1956 | Porter et al. | 196—24 |
| 2,956,004 | 10/1960 | Conn et al. | 208—91 |
| 2,987,470 | 6/1961 | Turken | 208—253 |
| 2,863,823 | 12/1958 | Moser | 208—92 |
| 3,227,645 | 1/1966 | Frukin et al. | 208—89 |
| 3,073,777 | 1/1963 | Oettinger | 208—59 |
| 3,180,820 | 4/1965 | Gleim et al. | 208—211 |
| 3,383,301 | 5/1968 | Beuther et al. | 208—216 |

DELBERT E. GANTZ, Primary Examiner

G. E. SCHMITKONS, Assistant Examiner

U.S. Cl. X.R.

208—89, 253

PO-1050
(5/69)

UNITED STATES PATENT OFFICE
CERTIFICATE OF CORRECTION

Patent No. 3,576,737      Dated April 27, 1971

Inventor(s) DAVID S. MITCHELL

It is certified that error appears in the above-identified patent and that said Letters Patent are hereby corrected as shown below:

Col. 6, line 60, "solid" should read --soluble--.

Signed and sealed this 29th day of February 1972.

(SEAL)
Attest:

EDWARD M.FLETCHER,JR.
Attesting Officer

ROBERT GOTTSCHALK
Commissioner of Patents